US005475531A

United States Patent [19]
Rahmlow et al.

[11] Patent Number: 5,475,531
[45] Date of Patent: Dec. 12, 1995

[54] BROADBAND RUGATE FILTER

[75] Inventors: Thomas D. Rahmlow, Bethleham; Aaron Turner, Torrington, both of Conn.

[73] Assignee: Hughes Aircraft Company, Los Angeles, Calif.

[21] Appl. No.: 320,584

[22] Filed: Oct. 11, 1994

Related U.S. Application Data

[63] Continuation of Ser. No. 61,610, May 6, 1993, abandoned.

[51] Int. Cl.$^6$ ............................................. G02B 5/28
[52] U.S. Cl. ......................... 359/586; 359/589; 359/885; 356/38 R; 385/130
[58] Field of Search ..................................... 385/130, 129; 359/586, 589, 885; 356/381, 382; 427/162, 163.2

[56] References Cited

U.S. PATENT DOCUMENTS

| | | | |
|---|---|---|---|
| 4,826,267 | 5/1989 | Hall et al. ................................ | 359/586 |
| 4,952,025 | 8/1990 | Gunning, III ........................... | 359/586 |
| 5,000,575 | 3/1991 | Southwell et al. .................... | 356/381 X |
| 5,028,136 | 7/1991 | Murarka et al. ....................... | 356/349 |
| 5,100,233 | 3/1992 | Southwell et al. .................... | 356/382 X |
| 5,181,143 | 1/1993 | Southwell .............................. | 359/586 |
| 5,293,548 | 2/1994 | Siebert .................................. | 359/586 X |

FOREIGN PATENT DOCUMENTS

85/01115  3/1985  WIPO .

*Primary Examiner*—Rodney B. Bovernick
*Assistant Examiner*—Hemang Sanghavi
*Attorney, Agent, or Firm*—W. C. Schubert; W. K. Denson-Low

[57] ABSTRACT

A broadband rugate filter (10) includes an optical substrate (12) having first and second surfaces, (14, 16) and a layer (18) of optical material deposited on one of the surfaces, (14, 16). The layer (18) has an index of refraction versus thickness profile having a frequency that continuously changes in a single direction.

12 Claims, 5 Drawing Sheets

5,475,531

BROADBAND RUGATE FILTER

This is a continuation application Ser. No. 08/061,610 filed May 6, 1993, abandoned.

BACKGROUND OF THE INVENTION

The present invention generally relates to a broadband rugate filter and, in particular, relates to one such broadband rugate filter having a sinusoidal index of refraction versus optical thickness profile having a frequency that continuously changes in a single direction.

Rugate filters differ from discrete stacked filters in that the index of refraction of the rugate varies as a function of the thickness of the deposited film. Typically, the optical thickness of the refractive index period determines the reflection band position and the amplitude of the variation of the index of refraction determines the reflection bandwidth. As generally known, multiple reflection bands can be generated by serially depositing individual index of refraction profiles for each reflection band or, alternatively, by superimposing multiple index of refraction profiles and depositing the bands in parallel. The use of superposition allows for increased film complexity without adding to the mechanical thickness of the deposited film. In instances where superimposed indices exceed the material indices or result in excessively high slew rates of the material sources, both serial and parallel techniques can be used.

Conventional rugate filters are designed using pure sine wave gradient index of refraction versus thickness profiles. The bandwidth of the reflection notch is related to the excursion of the index of refraction, i.e., the amplitude of the sine wave. The maximum bandwidth is therefore limited to the maximum difference in the refractive indices of the constituent materials. For typical infrared materials, such as ZnSe and ThF4, this limiting bandwidth is about 15%. In order to make a broader reflection band, reflectors designed for different wavelengths can be deposited serially. The difficulty with this technique is the presence of spectral leaks, or narrow pass bands, due to phase effects between the stacked rugate reflectors.

Consequently, it is highly desirable to provide a broadband rugate filter that substantially completely overcomes the above-recited difficulties of conventional rugate filters.

SUMMARY OF THE INVENTION

Accordingly, it is one object of the present invention to provide a broadband rugate filter that does not exhibit spectral leaks.

This object is accomplished, at least in part, by a broadband rugate filter an index of refraction versus thickness profile having a frequency that continuously changes in a single direction.

Other objects and advantages of the present invention will become apparent to those skilled in the art from the following detailed description read in conjunction with the appended claims and the drawings attached hereto.

BRIEF DESCRIPTION OF THE DRAWINGS

The drawings, not drawn to scale, includes.

DETAILED DESCRIPTION OF THE INVENTION

Figure 1:
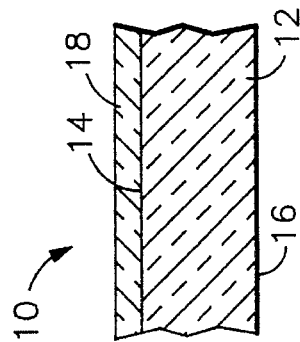
FIG. 1 which is a cross-sectional view of a broadband rugate filter embodying the principles of the present invention.

A broadband rugate filter, generally indicated at 10 in FIG. 1 and embodying the principles of the present invention, includes an optical substrate 12 having first and second opposing surfaces, 14 and 16, respectively, and a layer 18 disposed on the first surface 14, the layer 18 including a segment having a sinusoidal index of refraction versus optical thickness profile having a frequency that continuously changes in a single direction. As used herein, the term "optical thickness" is taken to mean the product of the mechanical thickness and the index of refraction.

Figure 2:
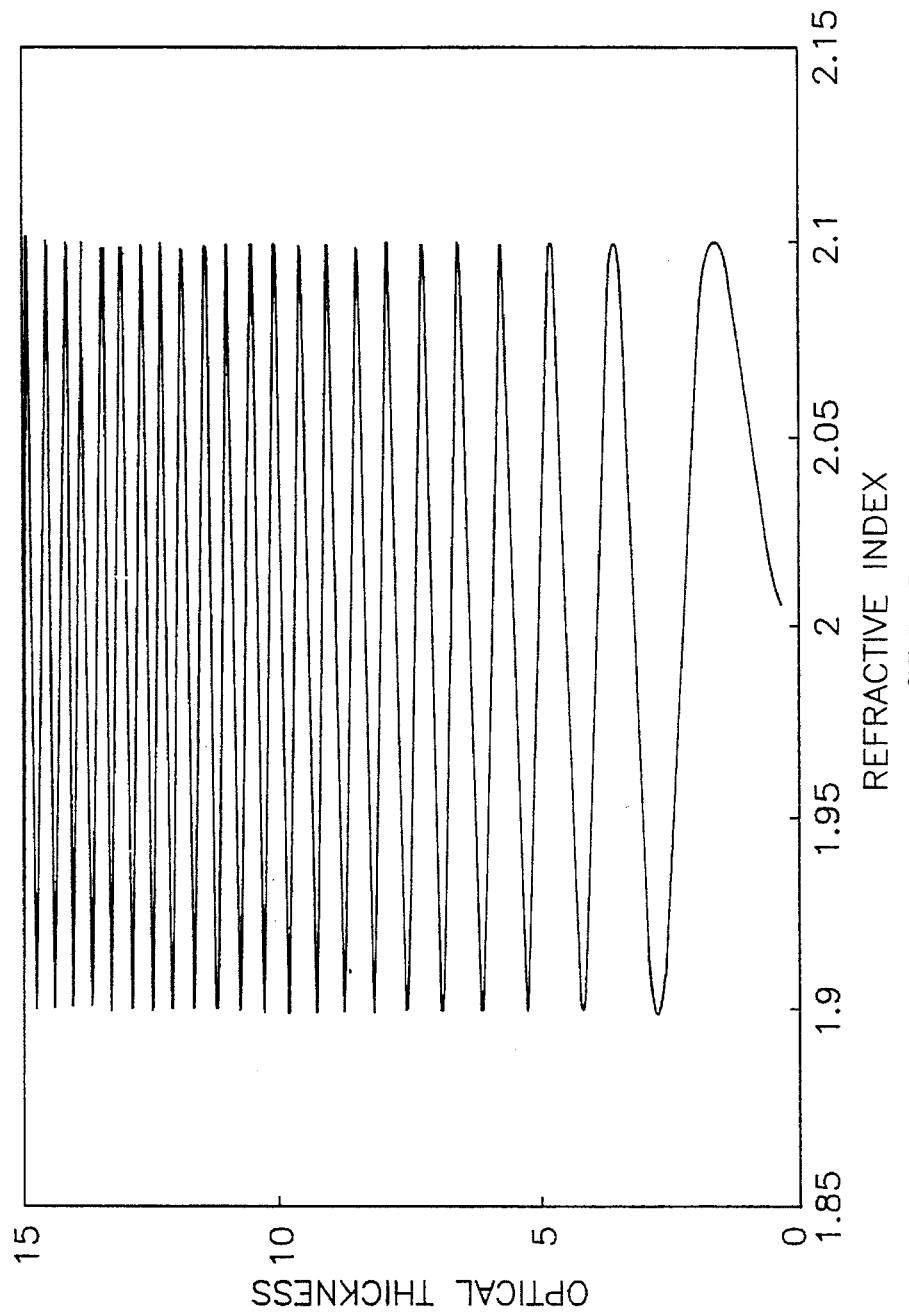
FIG. 2 which is an index of refraction versus optical thickness profile for a layer of film useful in the broadband rugate filter shown in FIG. 1.

In one embodiment, the broadband rugate filter 10 is a long wavelength pass band filter and the layer 18 has an index of refraction versus optical thickness profile as shown in FIG. 2. As shown therein, the frequency of the index of refraction versus optical thickness sinusoid changes over the thickness of the layer 18. Typically, for the long wavelength pass band filter, the film is deposited such that the index of refraction profile has a comparatively higher starting frequency and continuously changes toward a comparatively lower finishing frequency. Preferably, in this specific embodiment, the comparatively higher starting wavelength is about 4 micrometers, and the comparatively lower finishing wavelength is about 8 micrometers. In this embodiment, the final thickness over which the frequency variation occurs in the layer 18 is about 55 micrometers. Hence, it will be understood that the rate of change of the frequency through the layer 18 is slow. Such a slow variation ensures that adjacent cycles are coherently in phase to avoid the problems associated with stacked filters. It has been found that by use of such a film structure, the reflection bandwidth is only limited by the thickness of the layer 18.

In the preferred embodiments discussed herein, the rate of change of the frequency of the index of refraction profile is linear over the optical thickness of the film deposited. In particular, it is preferred that the rate of change at any point along the profile be about equal to about 10% of the frequency at that point. Further, as shown in FIG. 2, in this embodiment, the amplitude of the index of refraction profile is maintained constant.

Figure 3:
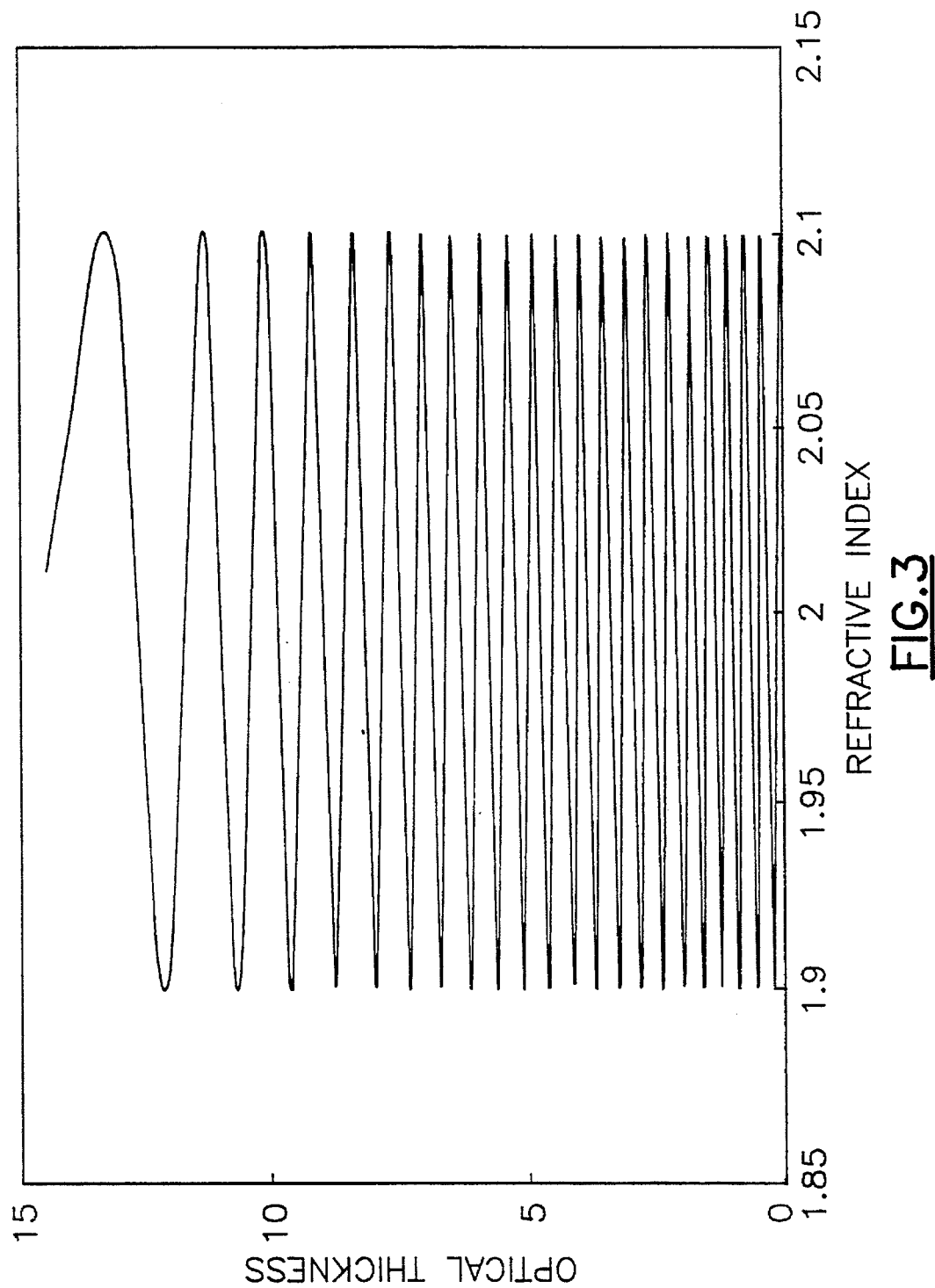
FIG. 3 which is an index of refraction versus optical thickness profile for another layer of film useful in the broadband rugate filter shown in FIG. 1.

In another embodiment, the broadband rugate filter 10 is a short wavelength pass band filter and the layer 18 has an index of refraction versus optical thickness profile as shown in FIG. 3. As shown therein, the frequency of the index of refraction versus optical thickness sinusoid changes over the thickness of the layer 18. Typically, for the short wavelength pass band filter, the film is deposited such that the index of refraction profile has a comparatively lower starting frequency and continuously changes toward a comparatively higher finishing frequency. Preferably, in this specific embodiment, the comparatively lower starting frequency is about 12 micrometers, and the comparatively higher finishing frequency is about 8 micrometers. In this embodiment, the final thickness over which the frequency variation occurs in the layer 18 is about 55 micrometers. Hence, as with the long wavelength pass band filter shown in FIG. 2, it will be understood that the rate of change of the frequency through the layer 18 is slow. Further, as shown in FIG. 3, in this embodiment, the amplitude of the index of refraction profile is maintained constant.

Figure 4:
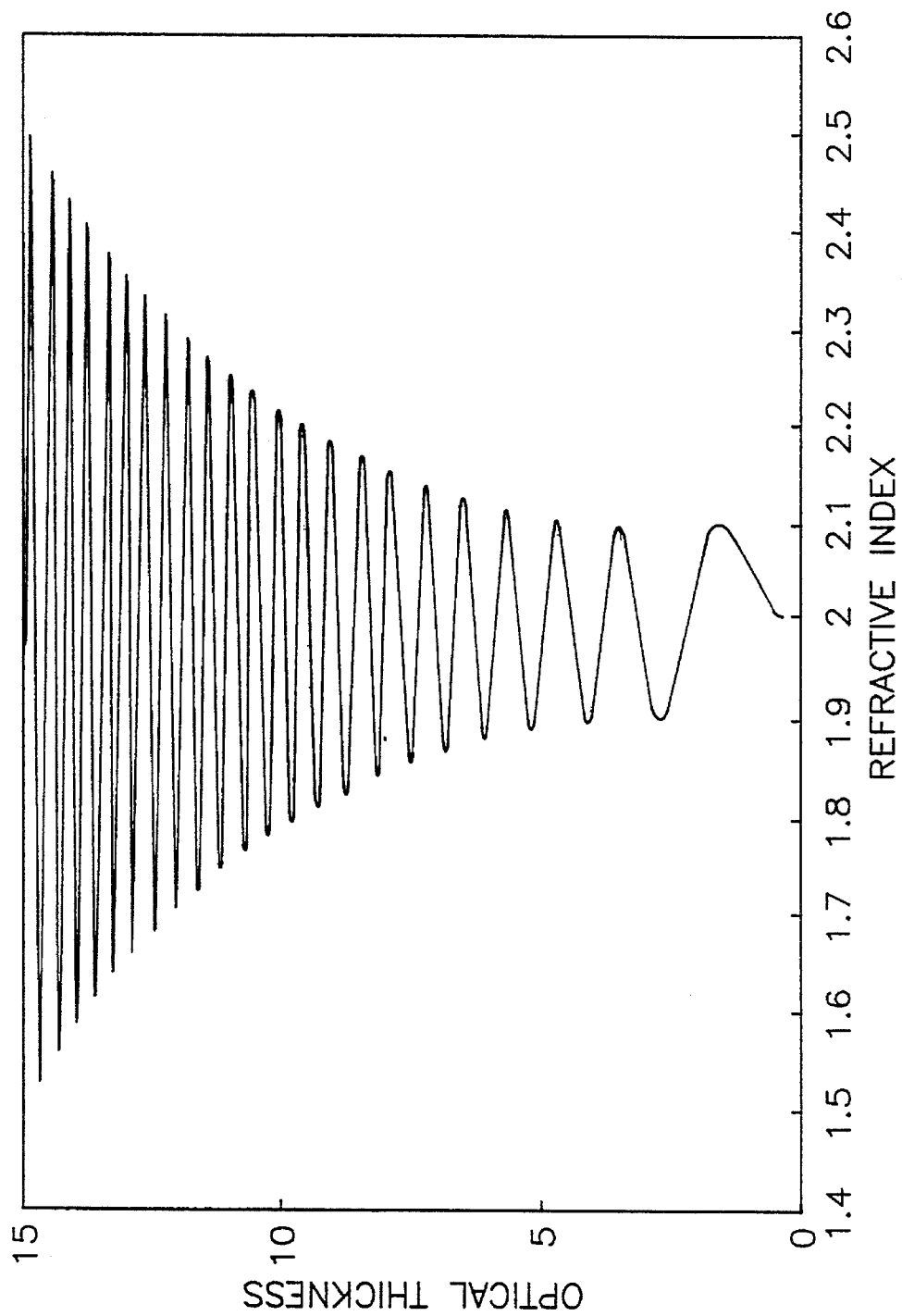
FIG. 4 which is an index of refraction versus optical thickness profile for a layer of film useful in the broadband rugate filter shown in FIG. 1.
Figure 5:
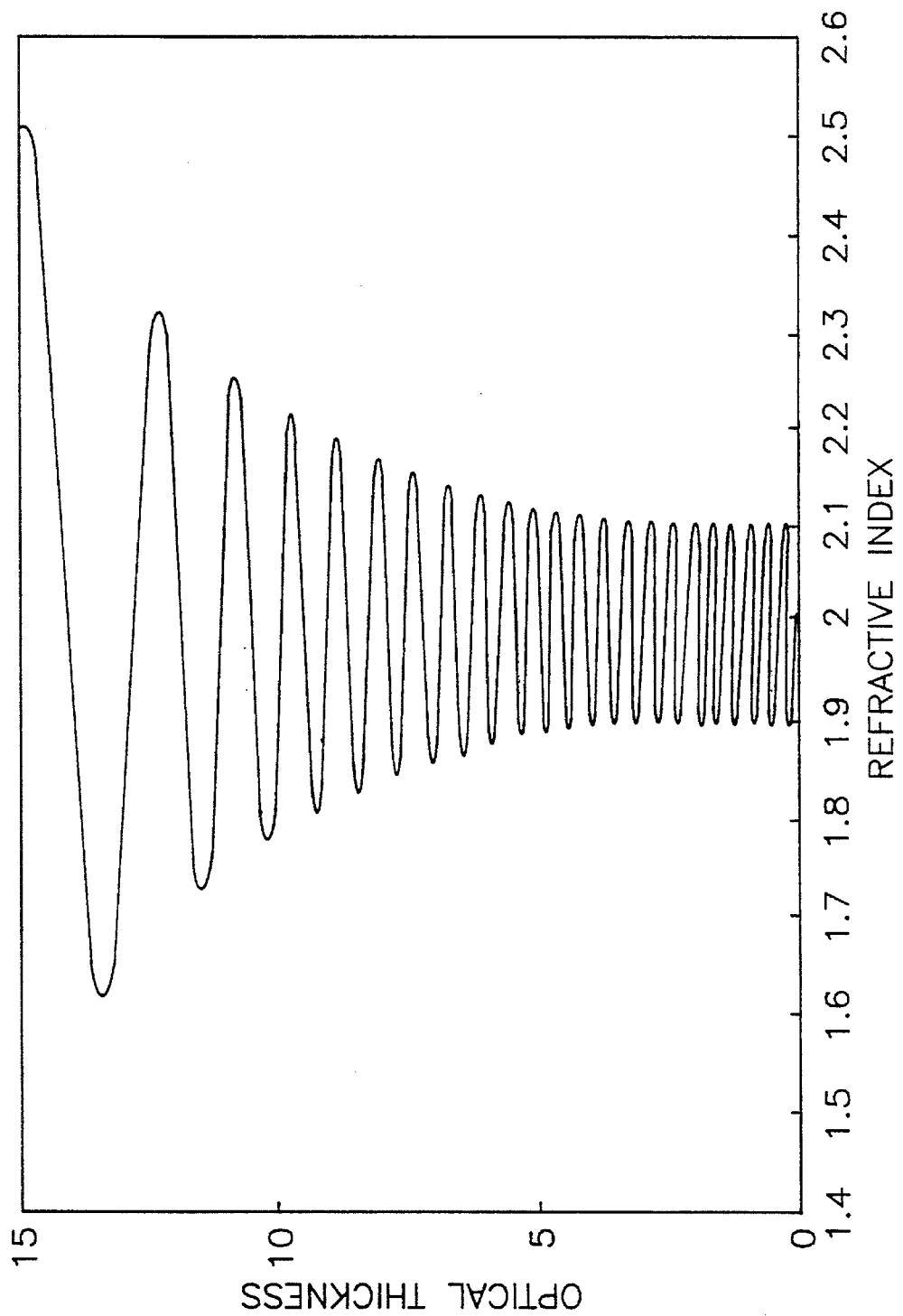
FIG. 5 which is an index of refraction versus optical thickness profile for another layer of film useful in the broadband rugate filter shown in FIG. 1.

It will be understood that although the rugate filters described above exhibit the desired broadband response, the pass band of the filters can be increased further by increasing the amplitude of the index of refraction of the profile. Such embodiments are shown in FIG. 4 and FIG. 5. The embodiment shown in FIG. 4 exhibits the characteristic of the long wavelength pass band filter shown in FIG. 2 having a continuous change in frequency varying from a comparatively lower frequency to a comparatively higher frequency. The embodiment shown in FIG. 5 exhibits the characteristic of the short wavelength pass band filter shown in FIG. 3 having a continuous change in frequency varying from a comparatively higher frequency to a comparatively lower frequency.

In both embodiments, the amplitude of the index of refraction profile is flared, i.e., the excursion of the index of refraction is gradually increased as the layer 18 is deposited. Preferably, the amplitude is increased at a rate of about 10% per cycle. Thus, a broadband rugate filter can be provided which, in practice, is limited primarily by the materials available for deposition and the practical final mechanical thickness of the layer 18.

It has been found that although the rugate filters characterized in FIGS. 2, 3, 4, and 5 exhibit the desired broadband response the edge roll-off of these embodiments, in some applications, are undesirable wide. Such a difficulty can be readily overcome by use of another rugate property, i.e., the ability to serially deposit different index of refraction versus optical thickness profiles to obtain different rejection wavelengths.

Figure 6:
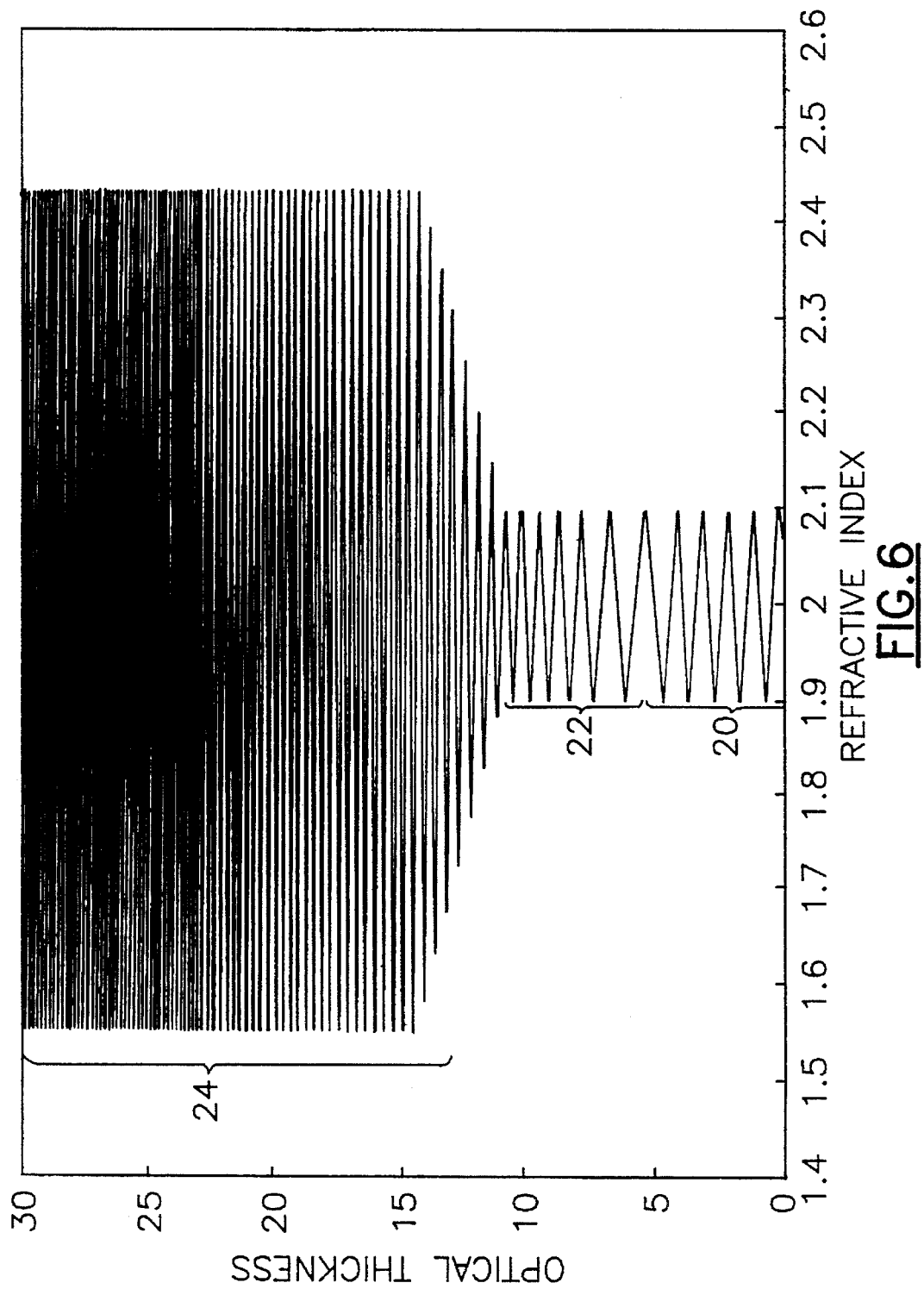
FIG. 6 which is an index of refraction versus optical thickness profile for another layer of film useful in the broadband rugate filter shown in FIG. 1.

As shown in FIG. 6, an index of refraction versus optical thickness profile includes a first section 20 of constant frequency and amplitude a second section 22, serially added to the first section 20, that has a frequency that continuously changes in a single direction and a third section 24 serially added to the second section 22, the third section 24 having a frequency that continuously changes in a single direction and an amplitude that changes in a single direction at least over a portion of the section 24. As shown, the third section 24 of such a rugate is preferably provided with an index of refraction versus optical thickness profile that has an amplitude that increases as previously discussed, the third section thus provides a broadband response. The rugate having the profile shown in FIG. 6 has a relatively sharper edge roll-off than the previously discussed rugates defined by the first section 20.

The broadband rugates discussed hereinabove can be fabricated using known materials and techniques known in the rugate manufacturing art.

Although the present invention has been described herein with respect to a number of specific embodiments, it will be understood by those skilled in the art that other arrangements or configurations can also be made that do not exceed the spirit and scope of this invention. Hence, the present invention is deemed limited only by the appended claims and the reasonable interpretation thereof.

What is claimed is:

1. A broadband rugate filter; comprising:

an optical substrate having first and second surfaces; and a layer of optical material, said layer of optical material being deposited on one of said surfaces, the index of refraction versus optical thickness of said layer varying sinusoidally, the frequency of the sinusoidal variation continuously changing in a single direction.

2. The broadband rugate filter as claimed in claim 1, wherein said frequency continuously decreases.

3. The broadband rugate filter as claimed in claim 2, wherein said frequency decreases at each point at a rate of about 10% of the frequency at that point.

4. The broadband rugate filter as claimed in claim 1, wherein said frequency continuously increases.

5. The broadband rugate filter as claimed in claim 4, wherein said frequency increases at each point at a rate of about 10% of the frequency at that point.

6. The broadband rugate filter as claimed in claim 1, wherein said layer has a mechanical thickness of about 55 micrometers.

7. The broadband rugate filter as claimed in claim 1, wherein the amplitude of said sinusoidal index of refraction versus optical thickness profile varies continuously in a single direction.

8. The broadband rugate filter as claimed in claim 7, wherein said amplitude varies in the same direction as said frequency.

9. The broadband rugate filter as claimed in claim 7, wherein said amplitude varies in the opposite direction as said frequency.

10. The broadband rugate filter as claimed in claim 7, wherein said amplitude varies at a rate of about 10% per cycle.

11. The broadband rugate filter as claimed in claim 1 wherein said layer further includes a section having an index of refraction versus optical thickness profile having a constant frequency.

12. The broadband rugate filter as claimed in claim 1 wherein said layer includes:

a first section of constant frequency and amplitude;

a second section, said second section being serially added to said first section, said second section having a frequency that continuously changes in a single direction; and a third section, said third section being serially added to said second section, said third section having a frequency that continuously changes in a single direction and an amplitude that changes in a single direction at least over a portion of said third section.

\* \* \* \* \*